(12) United States Patent
Basson et al.

(10) Patent No.: US 9,195,650 B2
(45) Date of Patent: *Nov. 24, 2015

(54) TRANSLATING BETWEEN SPOKEN AND WRITTEN LANGUAGE

(71) Applicant: Nuance Communications, Inc., Burlington, MA (US)

(72) Inventors: Sara H. Basson, White Plains, NY (US); Rick A. Hamilton, II, Charlottesville, VA (US); Dan Ning Jiang, Beijing (CN); Dimitri Kanevsky, Ossining, NY (US); David Nahamoo, Great Neck, NY (US); Michael A. Picheny, White Plains, NY (US); Bhuvana Ramabhadran, Great Neck, NY (US); Tara N. Sainath, Burlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,469

(22) Filed: Sep. 23, 2014

(65) Prior Publication Data

US 2015/0120275 A1 Apr. 30, 2015

Related U.S. Application Data

(60) Continuation of application No. 13/107,001, filed on May 13, 2011, now Pat. No. 8,856,004, and a continuation of application No. 14/289,434, filed on May 28, 2014, now Pat. No. 8,924,210, which is a division of application No. 13/107,001.

(51) Int. Cl.
*G06F 17/28* (2006.01)
*G10L 15/06* (2013.01)
(Continued)

(52) U.S. Cl.
CPC ............ *G06F 17/28* (2013.01); *G06F 17/2785* (2013.01); *G06F 17/289* (2013.01); *G10L 15/063* (2013.01); *G10L 15/26* (2013.01)

(58) Field of Classification Search
CPC .......... G06F 17/2785; G06F 17/30684; G06F 17/27; G06F 17/2809; G06F 17/3043; G06F 17/30401; G06F 17/274; G06F 17/2872; G06F 17/30737; G06F 17/289
USPC ........ 704/1–10, 250, 251, 255, 257, 277, 270
See application file for complete search history.

(56) References Cited

U.S. PATENT DOCUMENTS 6,092,038 A 7/2000 Kanevsky et al.
6,463,404 B1 * 10/2002 Appleby .......................... 704/9

(Continued)

FOREIGN PATENT DOCUMENTS

CA 2596126 A1 2/2008
JP 2003-132047 A 5/2003

OTHER PUBLICATIONS

Cettolo et al., Language Portability of a Speech Understanding System, Computer Speech and Language. vol. 12, No. 1, 1-21, Jan. 1998.

(Continued)

*Primary Examiner* — Huyen Vo
(74) *Attorney, Agent, or Firm* — Wolf, Greenfield & Sacks, P.C.

(57) ABSTRACT

Techniques for converting spoken speech into written speech are provided. The techniques include transcribing input speech via speech recognition, mapping each spoken utterance from input speech into a corresponding formal utterance, and mapping each formal utterance into a stylistically formatted written utterance.

18 Claims, 11 Drawing Sheets

(51) Int. Cl.
*G10L 15/26* (2006.01)
*G06F 17/27* (2006.01)

(56) References Cited

U.S. PATENT DOCUMENTS

| | | | |
|---|---|---|---|
| 7,167,825 B1 | 1/2007 | Potter | |
| 7,698,131 B2 | 4/2010 | Bennett | |
| 8,856,004 B2 | 10/2014 | Basson et al. | |
| 8,924,210 B2 | 12/2014 | Basson et al. | |
| 2006/0122832 A1 | 6/2006 | Takiguchi et al. | |
| 2007/0294077 A1* | 12/2007 | Narayanan et al. | 704/2 |
| 2008/0086299 A1* | 4/2008 | Anismovich et al. | 704/8 |
| 2010/0191521 A1 | 7/2010 | Huet et al. | |
| 2010/0324894 A1 | 12/2010 | Potkonjak | |
| 2012/0290299 A1 | 11/2012 | Basson et al. | |

OTHER PUBLICATIONS

Chafe et al. Properties of Spoken and Written Language, in Rosalind Horowitz and S.J. Samuels (eds.) Comprehending Oral and Written Language. 83-113, Academic Press. Also published as Technical Report No. 5 of the Center for the Study of Writing, Berkeley, May 1987.
Chafe et al. The Relation Between Written and Spoken Language, Annual Review of Anthropology, vol. 16, 383-407, 1987.
Filip et al., Text Normalization as a Special Case of Machine Translation, Proceedings of the International Multiconference on Computer Science and Information Technology, pp. 51-56. 2006.
Huber, From Machine Translation to Automatic Spoken Language Interpretation, 1992.
Kaji et al. Lexical Choice via Topic Adaptation for Paraphrasing Written Language to Spoken Language, AN 8814340. 2005.
Liberman, The Relation of Speech to Reading and Writing, in Frost R. & Katz, I. (1992), Orthography, Phonology, Morphology, and Meaning, North Holland.
Matsoukas et al, Integrating Speech Recognition and Machine Translation, 2006.
Murata et al. Automatic Extraction of Differences Between Spoken and Written Languages, and Automatic Translation from the Written to the Spoken Language (2002).
Nagao et al. Annotation Based Multimedia Summarization and Translation. 2000.
Price, Spoken Language Understanding. http://cslu.cse.ogi.edu/HLTsurvey/chlnode10.html, 1997.
Tannen. D. Spoken and Written Language: Exploring Orality and Literacy. Ablex. New Jersey. 1982.
TC-Star org, Connections to Global Bustness, Environment, Education & Culture, accessed Dec. 23, 2011.
Tillman, Eight Main Differences Between Collections of Written and Spoken Language Data, May 1997.
Vivian Cook. http://homepage.ntlworld com/vivian.c/Speech&Writing.htm accessed Jun. 6, 2011.
Wikipedia, Written Language, May 5, 2011, http://en.wikipedia.org/w/index.php?title=Written language&oldid=42730531.
Woszczyna et al., Recent Advances in Janus: A Speech Translation System, 2000.

* cited by examiner

TRANSLATING BETWEEN SPOKEN AND WRITTEN LANGUAGE

RELATED APPLICATIONS

This application is a continuation claiming the benefit under 35 U.S.C. §120 of U.S. patent application Ser. No. 14/289,434, filed on May 28, 2014 and entitled, "TEXT PROCESSING USING NATURAL LANGUAGE UNDERSTANDING," which is a divisional claiming the benefit under 35 U.S.C. §120 of U.S. patent application Ser. No. 13/107,001, filed on May 13, 2011 and entitled "TRANSLATING BETWEEN SPOKEN AND WRITTEN LANGUAGE." This application is also a continuation claiming the benefit under 35 U.S.C. §120 of U.S. patent application Ser. No. 13/107,001, filed on May 13, 2011 and entitled "TRANSLATING BETWEEN SPOKEN AND WRITTEN LANGUAGE." Each of the above-referenced applications is hereby incorporated by reference in its entirety.

FIELD OF THE INVENTION

Embodiments of the invention generally relate to information technology, and, more particularly, to translation technology.

BACKGROUND OF THE INVENTION

A number of differences exist between spoken and written language. For example, the syntax contained in written language can often be more formalized and complex compared to spoken language. Also, spoken language can more often be repeated and less precise. Spoken language can highlight information through intonation, while written language must do this through semantic and syntactic structures. There is also often unique written vocabulary, with some words written that are rarely, if ever, said in ordinary spoken speech.

Errors are often corrected in real-time during the production of spontaneously spoken language. Spoken language can also includes hesitations, and speaking often produces one "idea unit" at a time, with each idea unit having a fairly uniform length. Idea units are strung together with coordinating words, such as "and." In written language, writers have extra time and attention available to construct more integrated, complex sentences than what customarily occurs in spoken language.

Accordingly, the differences between written and spoken speech can result in a number of inconveniences and inappropriate communications. For example, a speaker can present a series of lectures, which are recorded and transcribed, and then wish to make these available as an article or book. The differences in spoken speech versus written speech make this task more difficult, because the transcribed spoken material generally needs to undergo considerable editing to make it suitable as a formally publishable document. As another example, a presenter might prepare a scripted text for oral delivery, using the more formal written style. If the presenter is not sensitive to the stylistic differences between written and spoken language, the oral delivery will likely be more difficult for the audience to understand, and the speaker may sound stilted and formal.

SUMMARY OF THE INVENTION

Principles and embodiments of the invention provide techniques for translating between spoken and written language. An exemplary method (which may be computer-implemented) for converting spoken speech into written speech, according to one aspect of the invention, can include steps of transcribing input speech via speech recognition, mapping each spoken utterance from input speech into a corresponding formal utterance, and mapping each formal utterance into a stylistically formatted written utterance.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
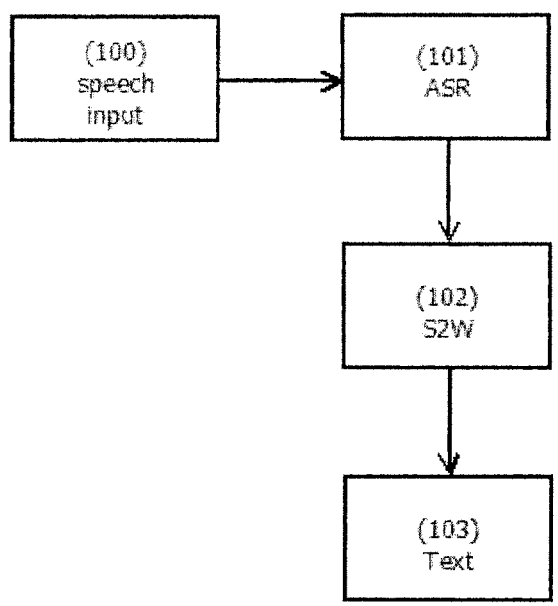
FIG. 1 is a diagram illustrating techniques for converting speech input into text output, according to an embodiment of the present invention.

Principles of the invention include providing a translation system that automatically converts stylistically spoken speech to written speech, and written speech to stylistically appropriate spoken speech. One or more embodiments of the invention can include extending techniques for machine translation, whereby maps are created between corpora in two languages which are then aligned automatically using statistical inference.

As noted herein, differences between written and spoken language include general characteristics between the two styles. There are also subtle differences in writing and spoken styles that can reflect a speaker or writer's gender, age, native language, dialect, socioeconomic background, educational level, and emotional state. The automatic conversion techniques described herein can be designed to incorporate these more subtle distinctions. For example, it may be desirable to convert the spoken language of an elderly southern United States speaker to a written style that is more youthful and more generic American.

By way of example, one or more embodiments of the invention can include a four-fold solution as a conference call service. This includes integration of multi-modalities (for example, audio, video, and text) in a conference system to provide more information for the communication. Transcription of text from a voice stream can be performed using dynamically-built models (for example, to help users who have difficulties in English listening comprehension). Also, rephrasing complex language with simple language can be implemented to help users (who, for example, might have a different language/cultural background). Further, one or more embodiments of the invention can include designing a user interface to maximally reduce the user's mental workload and help its information processing.

As detailed herein, a translation system in accordance with one or more embodiments of the invention includes the following modules. One module contains a database of spoken speech categories (SSC) that represents units of basic spoken speech characteristics. Example utterances can include repetitions, informal expressions, omissions, incorrect grammar order, run-on sentences, poor vocabulary choices, etc. A second module contains a database of written speech transformations (WST), which includes a list of rules for operations performed on spoken categories that can make spoken speech more akin to written language styles. Examples can include expansion of abbreviations, expansions of contractions, changes in grammatical ordering, shortening or splitting run-on sentences, insertion of punctuation, replacing repeated words with synonyms, replacing common words with more sophisticated synonyms, etc. A third component can include a training translation module that creates a WST and SSC from two parallel corpora of spoken and written speech via alignment and semantic identification processes of equivalent pieces of text.

Accordingly, two parallel corpora of written and spoken speech are created. One way of creating two parallel corpora includes having a user read written corpora and re-phrase it orally. Another way includes having a user speak and then write down the text that corresponds to what was said. These corpora are made parallel manually when the use labels the written text.

In one or more embodiments of the invention, the two "matched" corpora are aligned with each other using word markers that coincide. Note that this is different from the alignment process in translation, where two corpora are aligned using words that are equivalent in two different languages. This alignment creates a large database that shows how short phrases in one corpus map with short phrases in another corpus. Using this database, the machine learning system is trained to map phrases in one corpus that are aligned with phrases to another corpus automatically using statistical inference.

Additional corpora can be created to represent more subtle linguistic differences, such as stylistic differences stemming from age of the speaker/writer, education level of the speaker/writer, etc. Parallel corpora are also created for styles of interest, enabling the stylistic translation system to convert from one style to another.

Further, individual variability that exists between written and spoken language can be addressed by creating "written speech" models and "spoken speech" variants for people individually, thereby creating "speaker and writer dependent" models. This can be done, in one or more embodiments of the invention, by exploiting written materials that already exist for a given speaker to create the "written language" models. The person can then be asked to speak naturally about the materials in the written work, thereby creating a "matched" naturally spoken version on similar topics.

Additionally, in one or more embodiments of the invention, creating the training corpora can include the following. Users can speak naturally and their speech can be transcribed by speech recognition. By way of example, the topics that users speak about can be specific to particular domains, such as medical, law, etc. Also, an editor can correct any speech recognition errors to create a perfect transcript. The same or another editor can modify the text so that it is more appropriate for written language. For example, sentence fragments can be enhanced to create grammatical sentences. Additionally, an editor can create formal language style, or informal language style, as well as, for example, match the writing style of a particular author or to match the writing style to map to a particular technical journal.

Note that manually massaging and editing databases as input to speech transcription or translation systems can be carried out to create models for speech recognition systems. Additionally, one or more embodiments of the invention include editing of texts designed for a different purpose than ordinary creation of speech recognition or translation models. The system can be carried out in a hierarchical manner. For example, human labor can be used to edit transformation of speech/written text, and the system will learn the actions performed by editors, reducing the involvement of human labor with each transformation.

As described herein, one or more embodiments of the invention include representing a flow of data from acoustic to spoken words and from spoken words to written words, using acoustical features such as prosody, hesitations, etc. Statistical equations are used to train spoken to written speech translator, such as the following: $\text{Prob\_theta}(F|A) = \text{Prob\_theta}(F|T)\text{Prob}(T|A)/\text{Prob}(A,F|T)$ where F is formal (written) speech), T is spoken speech, and A is speech.

One or more embodiments of the invention also include representing metrics of proximity from one style to another, using an entropy-based measure that incorporates understandability over a specified number of words, such as edit-distance measures as used in machine translation. Such a process can be iterative. For example, first, several words can be mapped to some phrases and a determination can be made as to how the metric changed. The techniques described herein include continuing, iteratively, until achieving complex phrases. Additionally, parameters can be estimated with the expectation maximization (EM) algorithm, detailed below.

Note that the EM algorithm optimizing functions via association with an auxiliary function. Expectation step (E-step) is an association with the original function of auxiliary function. Also, maximization step (M-step) is optimization of the auxiliary function. This process is iterative because data that is found from M-step is used to update the auxiliary function from E-step. In special cases, this iteration process converges.

The need for EM algorithm can come from the nature of the function that is to be optimized in a statistical estimation problem. The function for estimation of parameters is Prob_theta(F|A)=f(theta)=Prob_theta(F|T)Prob_theta(T|A)/Prob(A,F|T). The optimization task is to find theta that optimizes f(theta).

This can be, for example, a complex function that cannot be optimized directly to estimate parameters. It includes a complex function Prob_theta(T|A) that arises from estimation of parameters in Hidden Markov Models (HMM). Such HMMs are usually associated with a speech recognition decoding that associates spoken utterances with acoustic signals. The function Prob_theta(F|T) can be associated with summation of all possible choices of associating a written utterance with spoken word utterances, as it is done in machine translation. For example, with each spoken word, one can associate several formal written expressions.

This allows alignment of a spoken word utterance with many possible formal written utterances. Also, each alignment of a spoken word utterance to a formal written utterance has some likelihood measure. The total probability Prob_theta(F|T) is a summation of all of these likelihoods of alignments. This expression can often be too complex to be optimized directly, and accordingly, the EM algorithm can be used to optimize it iteratively.

FIG. 1 is a diagram illustrating techniques for converting speech input into text output, according to an embodiment of the present invention. By way of illustration, FIG. 1 depicts speech input 100, which is provided to an automatic speech recognition (ASR) unit 101. ASR unit 101 processes the speech input 100 and provides input to spoken to written (S2W) text module 102, which then generates text 103, which is output by the system.

Figure 2:
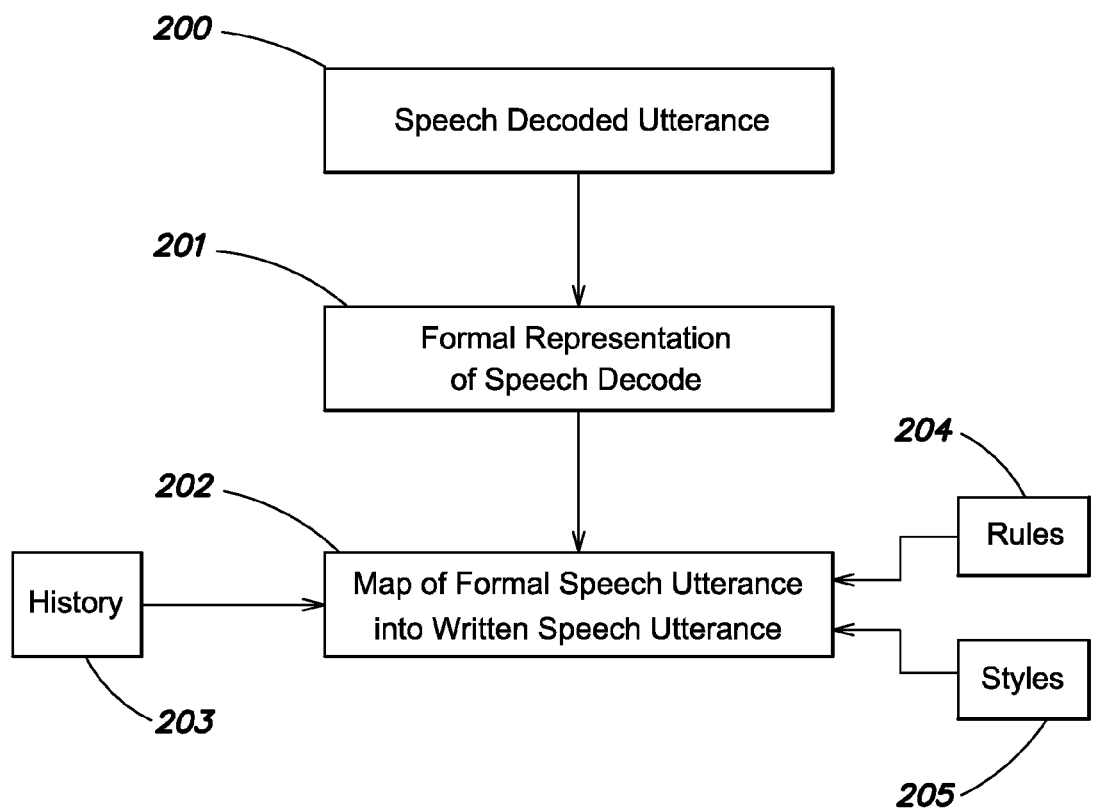
FIG. 2 is a diagram illustrating functionality of a spoken to written (S2W) module, according to an embodiment of the present invention.

FIG. 2 is a diagram illustrating functionality of a spoken to written (S2W) module, according to an embodiment of the present invention. By way of illustration, FIG. 2 depicts an explanation of the Explanation of S2W module 102 from FIG. 1. Given a speech decoded utterance 200, a formal representation 201 for this utterance is created. Subsequently, a map 202 of this formal speech utterance is done into a written speech utterance, using statistical rules 204, translation history 203 and styles of speech 205 input.

Figure 3:
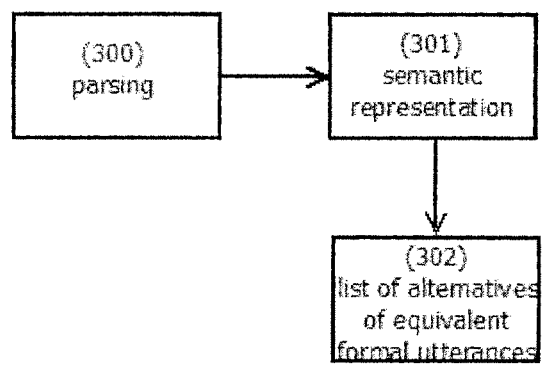
FIG. 3 is a diagram illustrating semantic representation of an utterance, according to an embodiment of the present invention.

FIG. 3 is a diagram illustrating semantic representation of an utterance, according to an embodiment of the present invention. By way of illustration in FIG. 3, a parsing module 300 creates a semantic representation 301 of the utterance. Because there can be many semantic representations, in one or more embodiments of the invention, an extra discriminative module can belong to block 301 to help differentiate better between certain representations over others. This representation is then given to module 302, which provides a list of alternatives of equivalent formal utterances.

Figure 4:
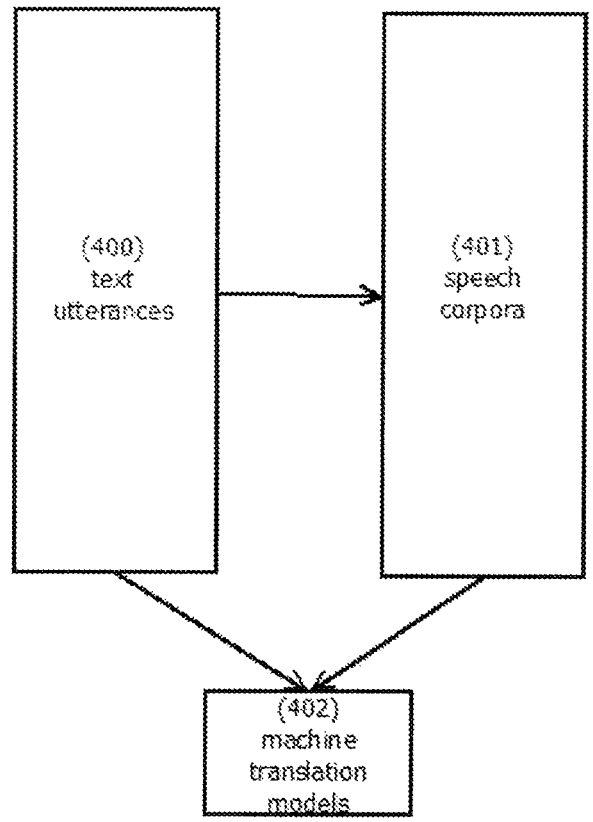
FIG. 4 is a diagram illustrating rephrasing text utterances as formal speech, according to an embodiment of the present invention.

FIG. 4 is a diagram illustrating rephrasing text utterances as formal speech, according to an embodiment of the present invention. By way of illustration in FIG. 4, text utterances 400 are rephrased as formal speech corpora 401, and given to a machine translation system 402 to create a set of models.

Figure 5:
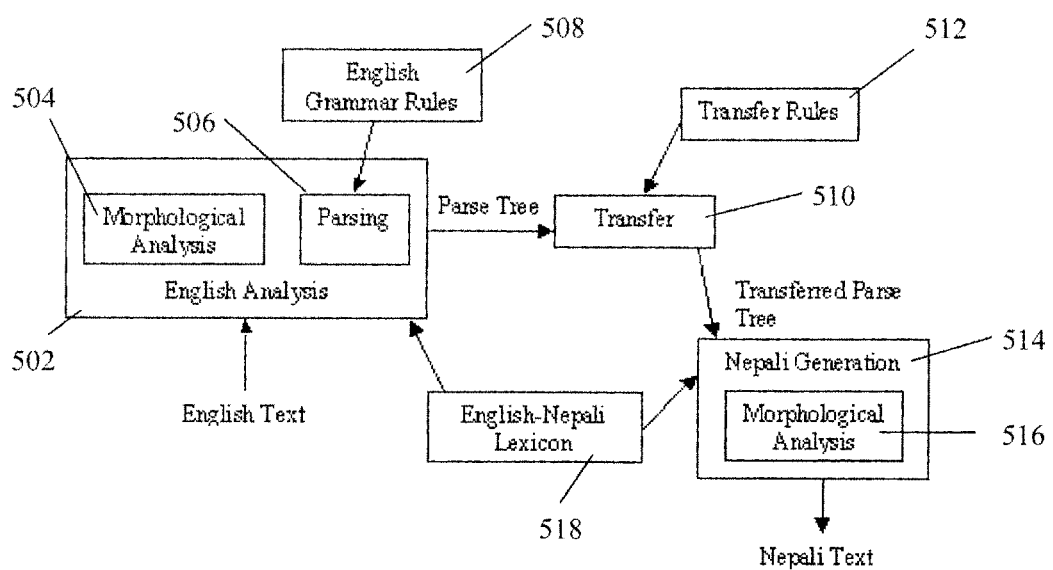
FIG. 5 is a diagram illustrating example architecture for translating text into a foreign language text, according to an embodiment of the present invention.

FIG. 5 is a diagram illustrating example architecture for translating text into a foreign language text, according to an embodiment of the present invention. By way of illustration, FIG. 5 depicts English text input to an English analysis module 502 (which includes a morphological analysis module 504 and a parsing module 506, which receives input from an English grammar rules module 508). Module 502 forwards a parse tree to a transfer module 510, which also receives input from a transfer rules module 512. The transfer module 510 sends a transferred parse tree to a Nepali (as an example foreign language) generation module 514, which includes a morphological analysis module 516, and ultimately outputs Nepali text. As also depicted in FIG. 5, an English-Nepali lexicon module 518 provides input to both the English analysis module 502 and the Nepali generation module 514.

As such, in other words, given a set of English texts, English grammar rules, and an English-foreign language lexicon (for example, Nepali), a parse tree is created. Subsequently, given this tree and a set of transfer rules, the phrase is translated into foreign (for example, Nepali) text.

Figure 6:
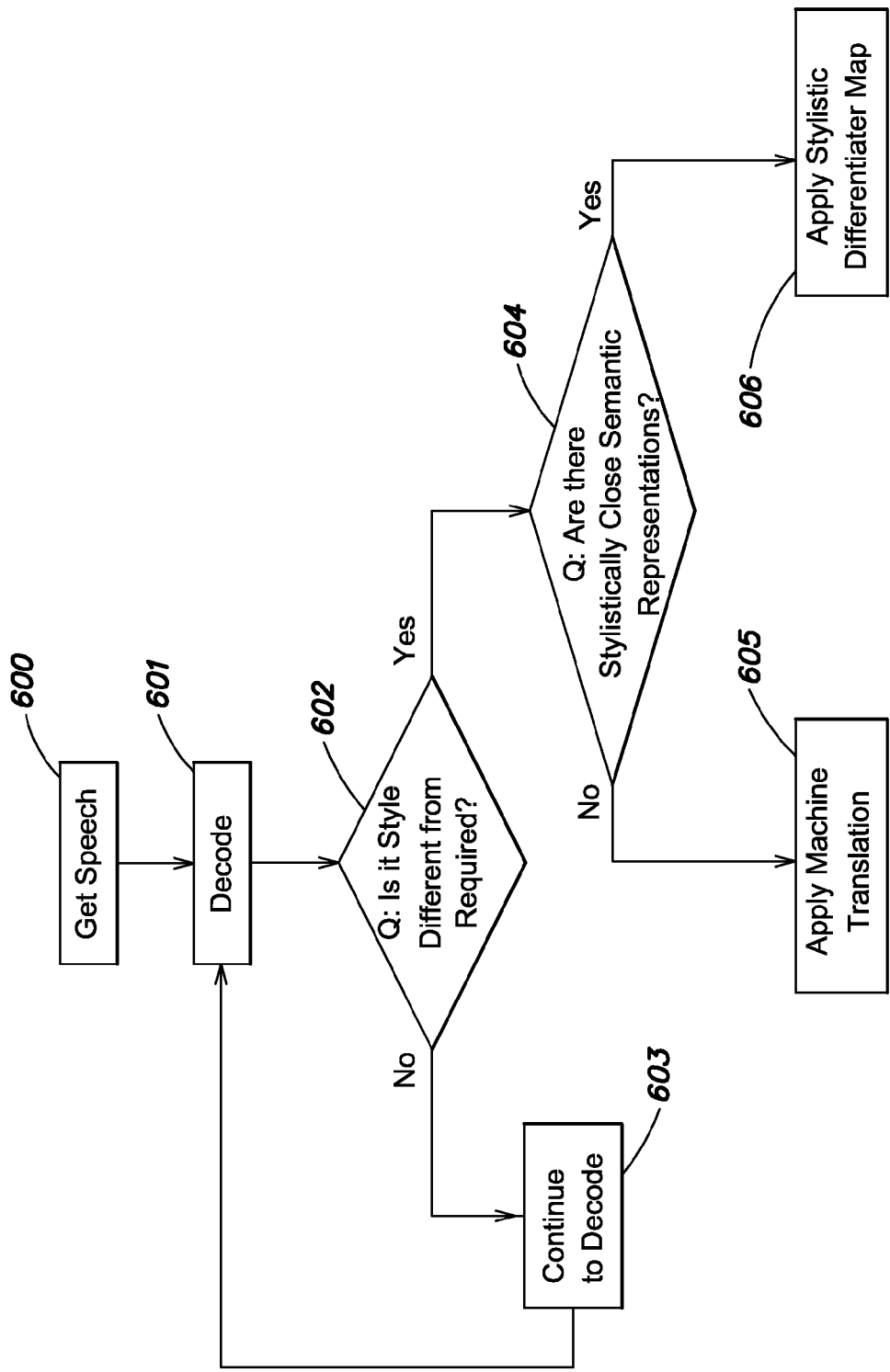
FIG. 6 is a diagram illustrating techniques for translating a speech utterance, according to an embodiment of the present invention.

FIG. 6 is a diagram illustrating techniques for translating a speech utterance, according to an embodiment of the present invention. Step 600 includes obtaining a speech utterance. Step 601 includes decoding the speech utterance. Step 602 includes determining if the utterance is different from required. By way of example, such a scenario can occur when someone requests that a spoken utterance was formulated in a style of legal documents (or a style of some writer, etc.). If no, the techniques proceed to step 603, which includes continuing to decode. If yes, the techniques proceed to step 604, which includes determining if there are stylistically close semantic representations. If the answer to this determination is no, the techniques proceed to step 605, which includes applying machine translation. If the determination is yes, the techniques proceed to step 606, which includes applying a stylistic differentiator map.

Figure 7:
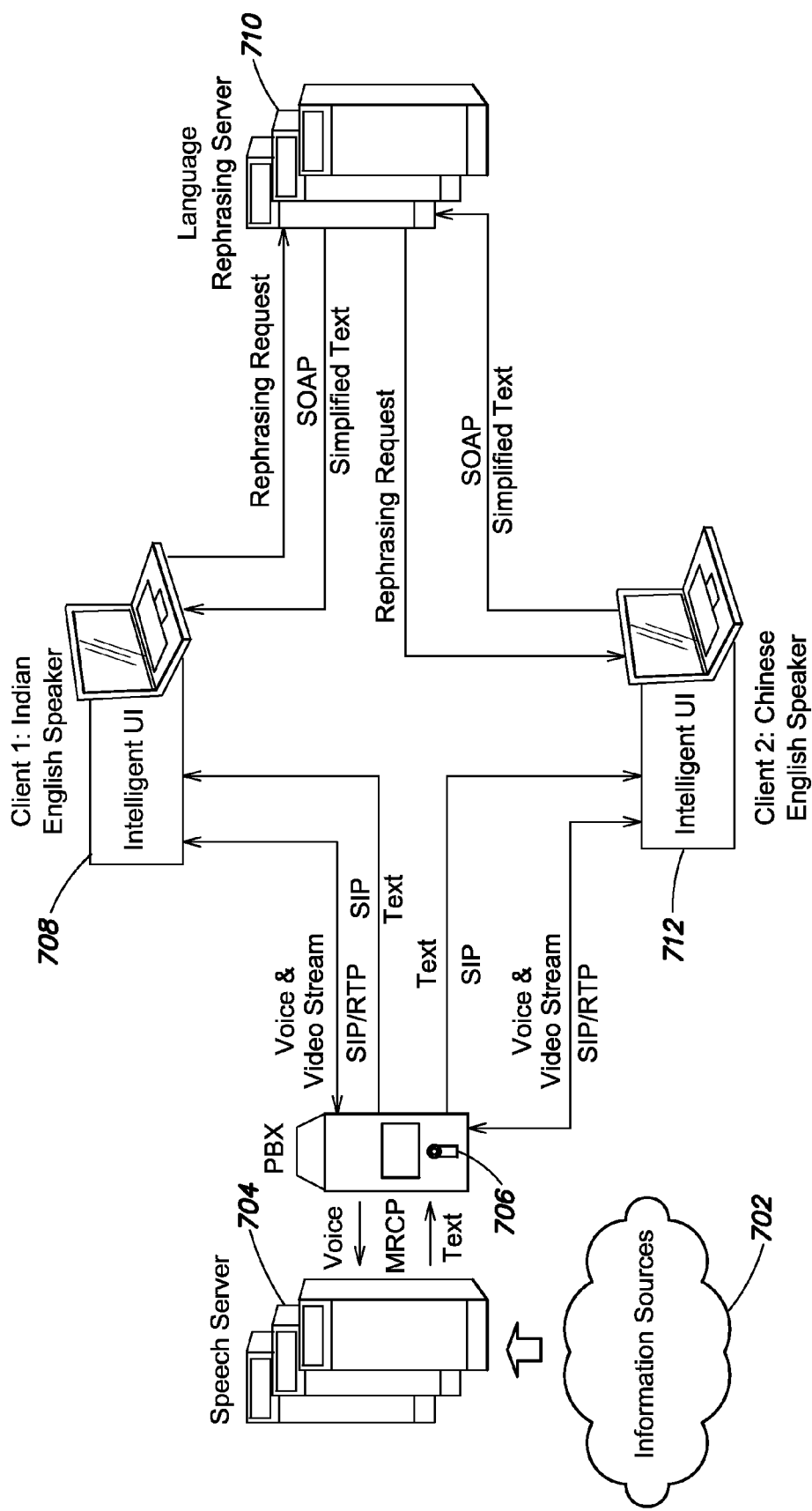
FIG. 7 is a diagram illustrating system architecture, according to an embodiment of the present invention.

FIG. 7 is a diagram illustrating system architecture, according to an embodiment of the present invention. By way of illustration, FIG. 7 depicts input of information sources 702, a speech server 704, a private branch exchange (PBX) 706, a first client (for example, an Indian English speaker) intelligent user interface (UI) 708, a language rephrasing server 710 and a second client (for example, a Chinese English speaker) intelligent UI 712.

FIG. 7 illustrates how one or more embodiments of the invention idea can be applied to support international conference calls, where all the participants have different language backgrounds but all speak English in the conference. The system provides real-time transcription, "translates" (or rephrases) complex English to simple English and presents the text to the participants to facilitate their understanding of the conference.

The system can be based, for example, on a voice-over-IP (VoIP) conferencing architecture. The speech transcription server 704 receives the voice flow from the PBX server 706, and transcribes the voice into text in real-time, and then sends the text flow back to the PBX server 706. The PBX server sends the text flow along with the voice and video streams to each client (participant) in the conference. When difficult sentences/phrases are detected by the user or the system, a rephrasing request is sent by the client to the language rephrasing server 710 to "translate" the complex English into simple English, which is then sent back to the client and shown on the screen to the user.

Figure 8:
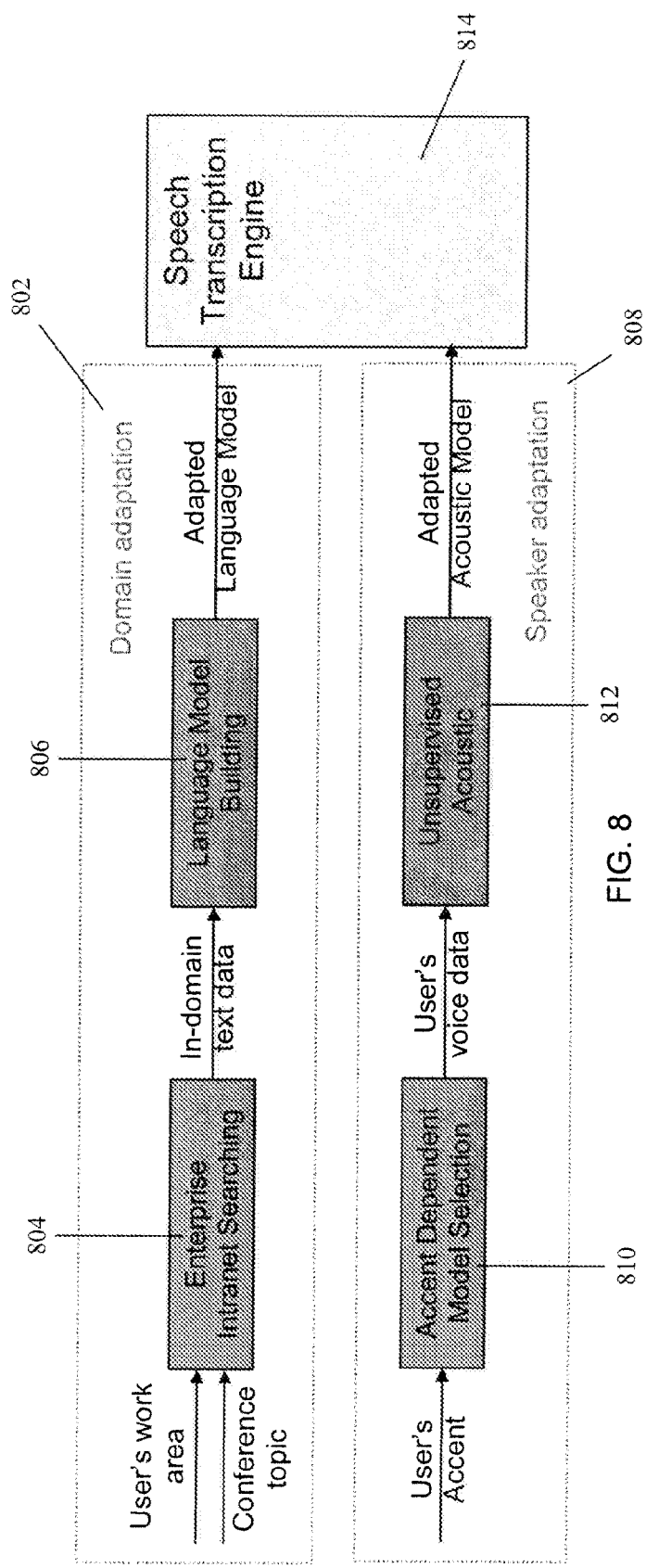
FIG. 8 is a diagram illustrating an example paradigm of adaptive speed transcription system, according to an embodiment of the present invention.

FIG. 8 is a diagram illustrating an example paradigm of adaptive speed transcription system, according to an embodiment of the present invention. By way of illustration, FIG. 8 depicts a domain adaptation component 802 and a speaker adaptation component 808. In the domain adaptation 802, a user's work area and a conference topic serve as input to an enterprise intranet searching component 804, which provides in-domain text data to a language model building component 806, which provides an adapted language model to a speech transcription engine 814. In the speaker adaptation 808, a user's accent serves as input to an accent dependent model selection component 810, which provides user's voice data to an unsupervised acoustic component 812, which provides an adapted acoustic model to speech transcription engine 814.

Accordingly, one or more embodiments of the invention include transcription of text from a voice stream using dynamically built models. Offline domain adaptation can be carried out according to participant profiles and conference topic(s). Also, dynamic speaker adaptation can be carried out according to the current speaker.

Figure 9:
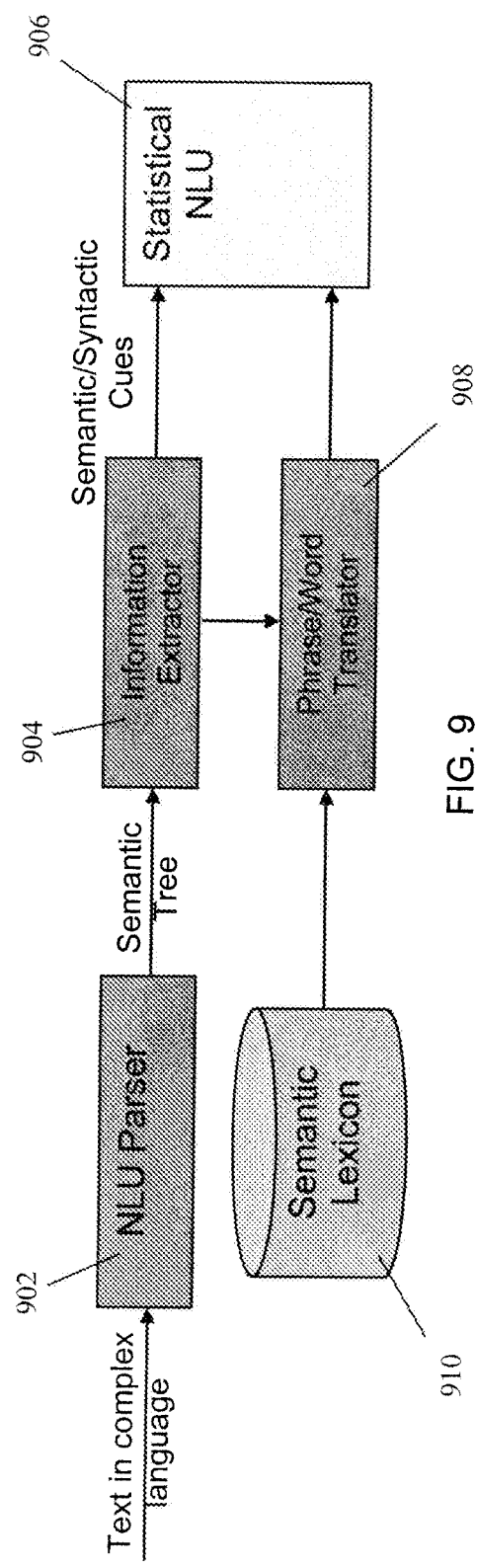
FIG. 9 is a diagram illustrating an example paradigm of the language rephrasing system, according to an embodiment of the present invention.

FIG. 9 is a diagram illustrating an example paradigm of the language rephrasing system, according to an embodiment of the present invention. By way of illustration, FIG. 9 depicts text in a complex language input to a natural language understanding (NLU) parser module 902, which provides a semantic tree to an information extractor module 904, which provides semantic/syntactic cues to a statistical NLU module 906. The information extractor module also provides input, as does a semantic lexicon module 910, to phrase/word translator module 908, which also then provides input to the statistical NLU module 906.

Accordingly, one or more embodiments of the invention include rephrasing complex language with simple language to help users who, for example, have a different language/cultural background. For instance, language and cultural distinctions can exist in multinational communications. At a language level, issues like slang, subjective mode, yes/no answer, etc. can exist, while communication difficulty can additionally be caused by culture differences and communication style variations. As such, the techniques detailed herein can include applying machine learning algorithms (for example, those used in machine translation) to convert complex language patterns to simple patterns.

As also described herein, one or more embodiments of the invention can include designing (and implementing) a user interface (UI) to maximally reduce the user's workload and help information processing.

One or more embodiments of the invention, as detailed herein, also include a translation system that includes a first module comprising a database of spoken speech categories (SSC) representing units of basic spoken speech characteristics, a second module comprising a database of written speech transformations (WST), and a third module comprising a training translation module that creates a spoken speech category and written speech transformation from two parallel corpora of spoken and written speech via alignment and semantic identification processes of equivalent pieces of text.

The first module can additionally includes sample utterances including, for example, repetitions, informal expressions, omissions, incorrect grammar order, run-on sentences, undesirable vocabulary choices, etc. The second module includes a list rules for operations performed on a spoken speech category to make spoken speech more similar to a written language style (for example, expansion of abbreviations, expansions of contractions (for example, "can't" to "cannot"), changes in grammatical ordering, shortening or splitting run-on sentences, insertion of punctuation, replacing repeated words with synonyms, replacing common words with more sophisticated synonyms). Also, the two parallel corpora can be created manually by having a user read a written corpus and re-phrase it orally and/or having a user speak a spoken corpus and write down text that corresponds to what was said.

Further, the third module matches one or more terms in the spoken and written corpora, aligns the matched corpora with each other using coinciding word markers and creates a database that indicates how short phrases in one corpus map with short phrases in another corpus. One or more embodiments of the invention can additionally include a machine learning system for mapping phrases in one corpus that are aligned with phrases to another corpus automatically using statistical inference.

Figure 10:
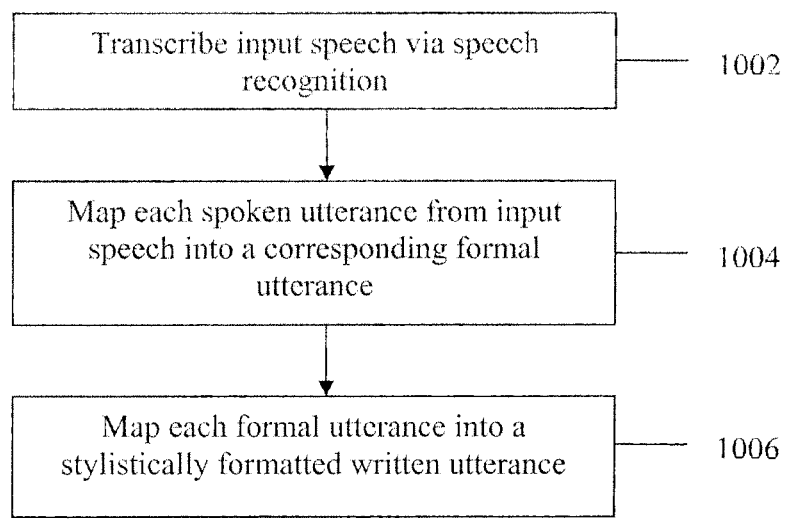
FIG. 10 is a flow diagram illustrating techniques for converting spoken speech into written speech, according to an embodiment of the invention.

FIG. 10 is a flow diagram illustrating techniques for converting spoken speech into written speech, according to an embodiment of the present invention. Step 1002 includes transcribing input speech via speech recognition. Step 1004 includes mapping each spoken utterance from input speech into a corresponding formal utterance. Mapping each spoken utterance from input speech into a corresponding formal utterance can include generating a set of alternative and equivalent formal representations of each spoken utterance. Step 1006 includes mapping each formal utterance into a stylistically formatted written utterance.

The techniques depicted in FIG. 10 can also include editing any speech recognition error to create a modified transcript of speech input. Creating a modified transcript can include modifying the transcript to more closely align the transcript with written grammar, as well as modifying the transcript to more closely align with a preferred language style (for example, formal language style, informal language style, a style that matches the writing style of a particular author, a style to map to a particular technical journal, etc.).

Additionally, the techniques depicted in FIG. 10 can include using a statistical equation to train a spoken to written speech translator. For instance, such a statistical equation can include $\text{Prob\_theta}(F|A) = \text{Prob\_theta}(F|T)\text{Prob}(T|A)/\text{Prob}(A, F|T)$, where F is written speech, T is spoken speech, A is speech spoken by an individual. "A" represents speech that was actually spoken by a person, orally. This is opposite to an expression that was written (or typed). In other words—the same message that is spoke orally and written is different in styles. Automatic transcription system that translates spoken speech into text is different from written speech. One or more embodiments of the invention can also include representing one or more metrics of proximity from one language style to another, using an entropy-based measure that incorporates understandability over a specified number of words (such as, for example, edit-distance measures as used in machine translation).

Further, one or more embodiments of the invention can include estimating parameters with an expectation maximization algorithm that optimizes one or more functions via association with an auxiliary function. A function for estimation of one or more parameters can include $\text{Prob\_theta}(F|A) = f(\text{theta}) = \text{Prob\_theta}(F|T) \text{Prob\_theta}(T|A)/\text{Prob}(A, F|T)$. Additionally, estimating parameters can also include associating the function $\text{Prob\_theta}(F|T)$ with a summation of all possible choices of associating a written utterance with one or more spoken word utterances. For example, with each spoken word one can associate several formal written expressions. Each alignment of a spoken word utterance with one or more possible formal written utterances has a likelihood measure, and total probability $\text{Prob\_theta}(F|T)$ can include a summation of all likelihoods of alignments.

The techniques depicted in FIG. 10 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include, by way merely of example, a speech recognition module, a formal mapping module and a stylistic formatting module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 10 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 11:
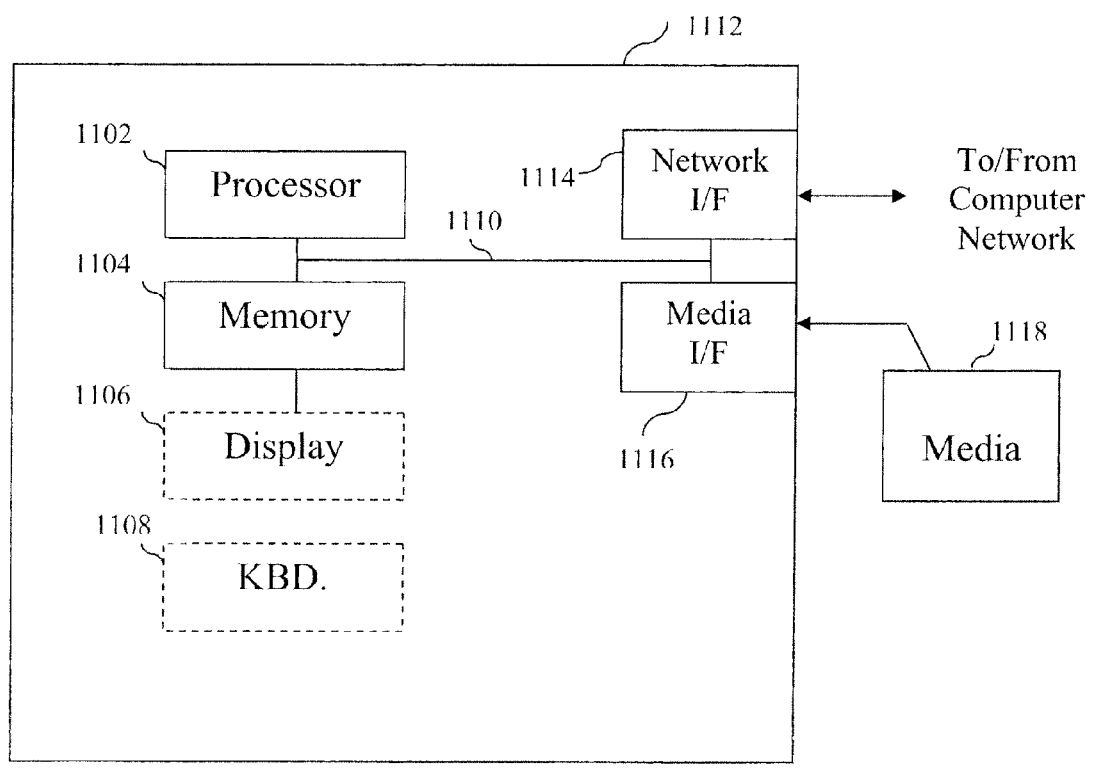
FIG. 11 is a system diagram of an exemplary computer system on which at least one embodiment of the invention can be implemented.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in the figures and corresponding descriptions herein. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, integration of multi-modalities (audio, video, text, etc.) in a conference system to provide more information for the communication.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for translating a first text in a first language style into a second text in a second language style, the method comprising acts of:

performing, by at least one processor, natural language understanding (NLU) processing on the first text to obtain at least one semantic representation of the first text; and using, by the at least one processor, the at least one semantic representation to generate the second text in the second language style, the second language style being different from the first language style, wherein the act of using the at least one semantic representation to generate the second text comprises:

identifying, from the first text, at least one first word or phrase that occurs in a first corpus, wherein the first corpus comprises a first plurality of texts in the first language style;

mapping the at least one first word or phrase to at least one second word or phrase that occurs in a second corpus, wherein the second corpus comprises a second plurality of texts in the second language style, the second plurality of texts in the second corpus being in a same language as the first plurality of texts in the first corpus; and using the at least one semantic representation and the at least one second word or phrase to generate the second text.

2. The method of claim 1, wherein the at least one semantic representation comprises a semantic tree, and wherein performing the NLU processing comprises using an NLU parser to parse the first text to obtain the semantic tree.

3. The method of claim 2, wherein using the at least one semantic representation to generate the second text comprises using the semantic tree in conjunction with a semantic lexicon to generate the second text.

4. The method of claim 1, wherein the NLU processing comprises:

creating a plurality of candidate semantic representations of the first text; and selecting the at least one semantic representation from the plurality of candidate semantic representations.

5. The method of claim 1, wherein the first language style comprises a spoken language style and the second language style comprises a written language style.

6. The method of claim 1, wherein the first language style comprises a language style associated with a first cultural background and the second language style comprises a language style associated with a second cultural background.

7. At least one non-transitory computer readable storage medium having encoded thereon instructions that, when executed by at least one processor, cause the at least one processor to perform a method for translating a first text in a first language style into a second text in a second language style, the method comprising acts of:

performing, by the at least one processor, natural language understanding (NLU) processing on the first text to obtain at least one semantic representation of the first text; and using, by the at least one processor, the at least one semantic representation to generate the second text in the second language style, the second language style being different from the first language style, wherein the act of using the at least one semantic representation to generate the second text comprises:

identifying, from the first text, at least one first word or phrase that occurs in a first corpus, wherein the first corpus comprises a first plurality of texts in the first language style;

mapping the at least one first word or phrase to at least one second word or phrase that occurs in a second corpus, wherein the second corpus comprises a second plurality of texts in the second language style, the second plurality of texts in the second corpus being in a same language as the first plurality of texts in the first corpus; and using the at least one semantic representation and the at least one second word or phrase to generate the second text.

8. The at least one non-transitory computer readable storage medium of claim 7, wherein the at least one semantic representation comprises a semantic tree, and wherein performing the NLU processing comprises using an NLU parser to parse the first text to obtain the semantic tree.

9. The at least one non-transitory computer readable storage medium of claim 8, wherein using the at least one semantic representation to generate the second text comprises using the semantic tree in conjunction with a semantic lexicon to generate the second text.

10. The at least one non-transitory computer readable storage medium of claim 7, wherein the NLU processing comprises:

creating a plurality of candidate semantic representations of the first text; and selecting the at least one semantic representation from the plurality of candidate semantic representations.

11. The at least one non-transitory computer readable storage medium of claim 7, wherein the first language style comprises a spoken language style and the second language style comprises a written language style.

12. The at least one non-transitory computer readable storage medium of claim 7, wherein the first language style comprises a language style associated with a first cultural background and the second language style comprises a language style associated with a second cultural background.

13. A system for translating a first text in a first language style into a second text in a second language style, the system comprising:

at least one memory storing executable instructions; and at least one processor programmed by the executable instructions stored in the at least one memory to:

perform natural language understanding (NLU) processing on the first text to obtain at least one semantic representation of the first text; and use the at least one semantic representation to generate the second text in the second language style, the second language style being different from the first language style, wherein the at least one processor is programmed to generate the second text at least in part by:

identifying, from the first text, at least one first word or phrase that occurs in a first corpus, wherein the first corpus comprises a first plurality of texts in the first language style;

mapping the at least one first word or phrase to at least one second word or phrase that occurs in a second corpus, wherein the second corpus comprises a second plurality of texts in the second language style, the second plurality of texts in the second corpus being in a same language as the first plurality of texts in the first corpus; and using the at least one semantic representation and the at least one second word or phrase to generate the second text.

14. The system of claim 13, wherein the at least one semantic representation comprises a semantic tree, and wherein the NLU processing comprises using an NLU parser to parse the first text to obtain the semantic tree.

15. The system of claim 14, wherein the at least one processor is programmed to use the semantic tree in conjunction with a semantic lexicon to generate the second text.

16. The system of claim 13, wherein the NLU processing comprises:
 creating a plurality of candidate semantic representations of the first text; and
 selecting the at least one semantic representation from the plurality of candidate semantic representations.

17. The system of claim 13, wherein the first language style comprises a spoken language style and the second language style comprises a written language style.

18. The system of claim 13, wherein the first language style comprises a language style associated with a first cultural background and the second language style comprises a language style associated with a second cultural background.

* * * * *